United States Patent [19]

Sundt

[11] 4,390,423
[45] Jun. 28, 1983

[54] APPARATUS FOR MAGNETIC TREATMENT OF A FLOWING LIQUID

[75] Inventor: Eilert Sundt, Sandefjord, Norway

[73] Assignee: Olaf Fjeldsend A/S, Sandefjord, Norway

[21] Appl. No.: 276,368

[22] PCT Filed: Oct. 28, 1980

[86] PCT No.: PCT/NO80/00030
§ 371 Date: Jun. 19, 1981
§ 102(e) Date: Jun. 19, 1981

[87] PCT Pub. No.: WO81/01112
PCT Pub. Date: Apr. 30, 1981

[51] Int. Cl.³ ............................................. B01D 35/06
[52] U.S. Cl. ....................................................... 210/222
[58] Field of Search ......................................... 210/222

[56] References Cited

U.S. PATENT DOCUMENTS

| | | | |
|---|---|---|---|
| 2,678,728 | 5/1954 | Spodig | 209/219 X |
| 2,678,729 | 5/1954 | Spodig | 209/219 X |
| 2,876,902 | 3/1959 | Varekamp | 209/232 X |
| 3,228,878 | 1/1966 | Moody | 210/222 |
| 3,345,594 | 10/1967 | Vermelren | 210/222 |
| 3,680,705 | 8/1972 | Happ et al. | 210/222 |
| 4,278,549 | 7/1981 | Abrams | 210/222 |

FOREIGN PATENT DOCUMENTS

| | | | |
|---|---|---|---|
| 220163 | 3/1962 | Fed. Rep. of Germany | 210/222 |
| 616589 | 3/1961 | Norway | 210/222 |
| 176638 | 9/1961 | Sweden | 210/222 |
| 204276 | 5/1966 | Sweden | 210/222 |
| 222330 | 7/1942 | Switzerland | 210/222 |

Primary Examiner—Frank A. Spear, Jr.
Attorney, Agent, or Firm—Watson, Cole, Grindle & Watson

[57] ABSTRACT

An apparatus for the magnetic treatment of a flowing liquid includes an elongated housing, which is made at least in part of a ferromagnetic material and which defines a liquid flow channel therethrough, and at least one elongated permanent magnet positioned in the flow channel. Each elongated permanent magnet has at least one elongated pole shoe associated therewith which includes a projection portion which extends into the flow channel so as to form a narrow gap between its top and either the inside wall of the elongated housing or the top of the projection portion of another pole shoe. Each projection portion is elongated in the direction of the flow channel and is angled such that the gap formed thereby is elongated and is oriented at an acute angle to the flow direction of the liquid passing through the elongated housing. The flowing liquid must pass through a formed gap and thereby be subjected to the influence of a magnetic field.

8 Claims, 13 Drawing Figures

APPARATUS FOR MAGNETIC TREATMENT OF A FLOWING LIQUID

BACKGROUND OF THE INVENTION

The present invention relates to an apparatus for the magnetic treatment of a flowing liquid, such as water, in order to prevent precipitation of dissolved substances and to reduce the corrosive effects of the liquid on the conduits and service apparatus contacted thereby. Such magnetic treatment of flowing liquids and various apparatus for effecting the treatment are previously known and are of particular interest in relation to water of the type which is apt to cause scale, e.g., calciferos deposits.

Such previously known treatment apparatus comprise a flow-through housing which is made, at least in part, of a ferromagnetic material and which contains at least one permanent magnet having at least one pole shoe so mounted in the housing that the pole shoe defines a gap through which the liquid to be treated is caused to flow, the liquid being subjected to the magnetic field created between the pole shoe and the wall of the housing. When using permanent magnets in the shape of a rod or an annular cylinder, the flow section and length of the gap is relatively restricted, so that it is necessary to provide very great permanent magnets, with the inconveniences inherent to the dimensions of the permanent magnet. Further, the magnets must be prepared from cast magnetic alloys having a high cobalt content.

The apparatus according to the present invention is constructed so as to satisfy the desire for a great flow section and so as to allow the use of magnets prepared from ferritic material of moderate dimensions.

SUMMARY OF THE INVENTION

According to the invention, the apparatus includes a pole shoe which is formed with at least one projecting part extending along the pole surface of the permanent magnet at an angle to the flow direction of the liquid through the gap. When using ferritic or other ceramic magnets which, while retaining a high remanence, may be prepared in the shape of discs or cylinders of relatively little height, it is possible to form the gap between the pole shoe and the housing along a line which extends acutely with respect to the flow direction of the liquid, possibly in the form of an angle or a screw line, from one end of a pole surface to the other, so that the gap will be of a comparatively great length parallel to the pole surface in the flow direction of the liquid.

The efficiency of the apparatus may be increased by arranging two or more permanent magnets in parallel in the flow path of the liquid to be treated, with one pole shoe on each of the pole surfaces which face each other.

Further, the flow section of the gap between the pole shoe and the housing may be adjusted in accordance with the desired quantity of flow by arranging a member made of non-ferromagnetic material in the gap for the purpose of short circuiting the magnetic field.

The apparatus according to the invention will now be more fully described with reference to the accompanying drawings, which illustrate various embodiments of the apparatus.

DETAILED DESCRIPTION OF THE PREFERRED EMBODIMENTS

Figure 1:
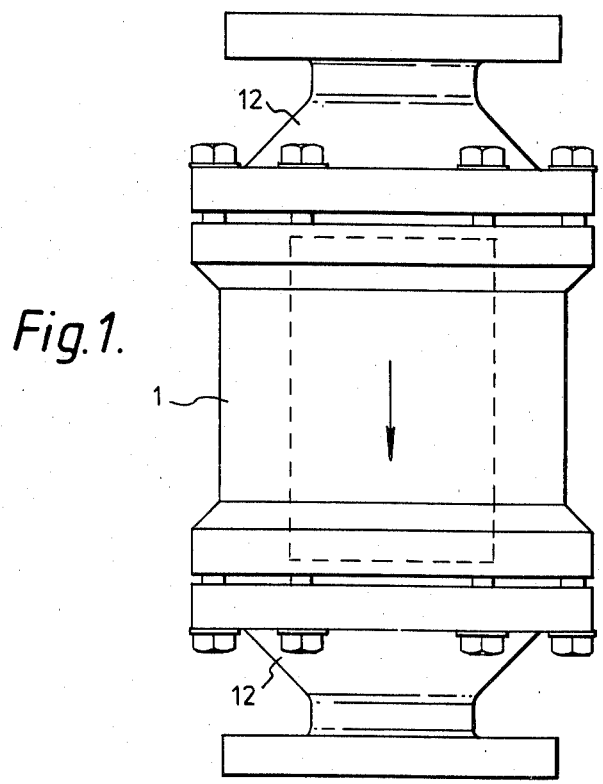
FIG. 1 is an external side view of the inventive apparatus.

In the drawings 1 is the apparatus housing which, at least in part, is made of a ferromagnetic material, and is shown in the form of an annular cylinder having its length axis extending in the flow direction of the liquid to be treated. In the housing 1 a permanent magnet 2 made of ferritic or ceramic material is mounted, extending in the direction of length of the housing 1 and supported against the inner wall of the housing through non-ferromagnetic blocks 3. On the pole surfaces N and S the magnet 2 is provided with pole shoes 4 which are each formed with a projection 6 which extends outwardly into the liquid flow channel in the annular cylinder and towards the inner wall of the housing 1, each thereby defining a narrow gap 7 between the top thereof and the inside wall of the housing 1. Each projection 6 is elongated in the direction of the flow channel through the annular housing such that the gap 7 formed thereby is also elongated in the direction of the flow channel. Thus, the magnetic flux of the magnet 2 will be closed through the pole shoe 4 and the two gaps 7 and the housing 1.

Figure 4A:
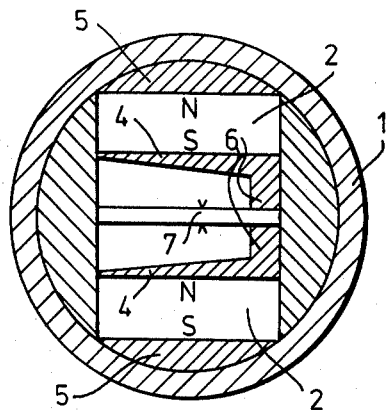
FIG. 4 illustrates the surface of one type of a pole shoes as seen towards N in FIG. 2, FIGS. 4a and 4b representing respective sectional and partial sectional views taken at the lines a—a and b—b of an inventive apparatus containing twin magnets and associated facing pole shoes as shown in FIG. 4.
Figure 4:
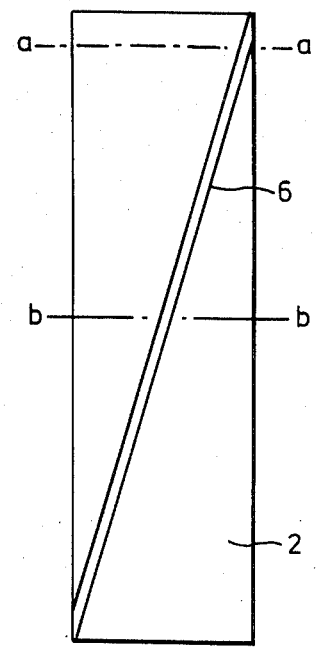
Figure 4B:
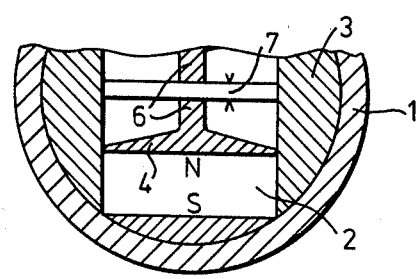
Figure 5A:
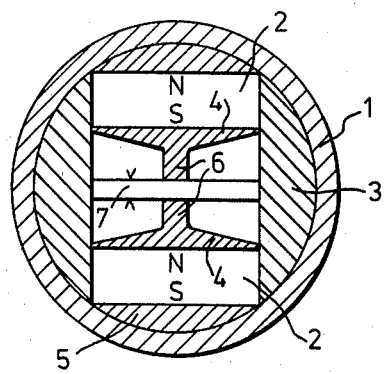
FIG. 5 illustrates a pole shoe provided with a V-formed projection, FIGS. 5a, 5b and 5c representing respective sectional and partial sectional views taken at the lines a—a, b—b and c—c of an inventive apparatus containing twin magnets and associated facing pole shoes as shown in FIG. 5.
Figure 5:
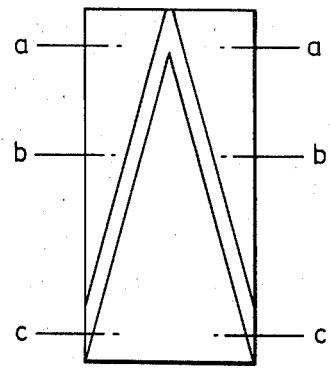
Figure 5B:
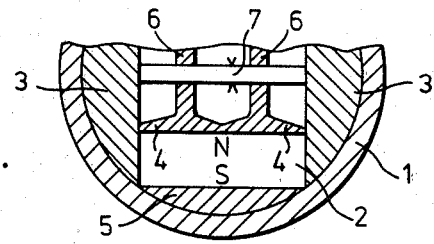
Figure 5C:
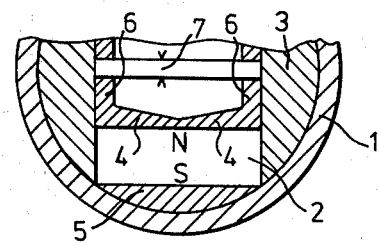

According to the invention, each projection 6 is so formed that its length direction extends along the pole surfaces N and S at an angle to the direction of length of the housing 1, so that the gaps 7, when projected onto the surfaces N and S, will extend rectilinearily, as shown in FIG. 4, or angularly, as shown in FIG. 5. Facing the cylindrical housing 1, the gaps 7 extend along a helical line. The essential point is that the length of the gap 7 in the direction of length of the housing 1 is such that a big total sectional area of the gap is obtained, even with a narrow gap, through which the liquid may flow, while being subjected to the magnetic field. In this manner a comparatively thin layer of flowing liquid is subjected to an influence which becomes specifically stronger the thinner the layer is, so that the apparatus may be equipped with a magnet of moderate strength and the dimensions of the apparatus may be kept low.

Figure 2:
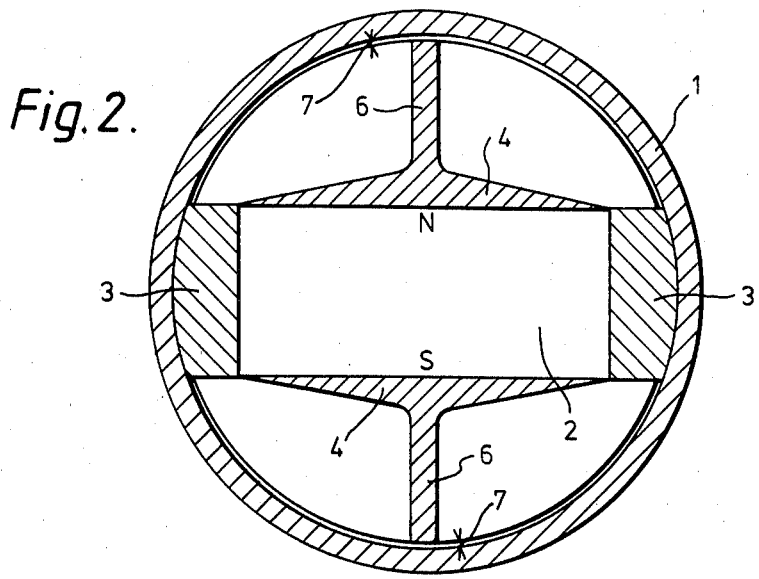
FIG. 2 is a sectional view of one embodiment of the inventive apparatus as seen at about half way along its length and in the direction of flow of the liquid passing therethrough, the apparatus including one magnet and two magnet gaps arranged in parallel in the liquid flow.
Figure 3:
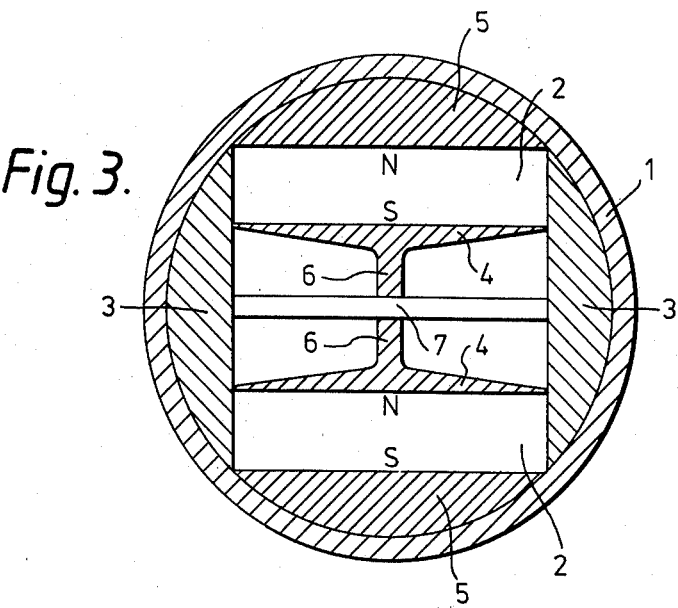
FIG. 3 is a sectional view of another embodiment of the inventive apparatus as seen at about half way along its length and in the direction of flow of the liquid, the apparatus including two magnets arranged in parallel in the liquid flow with associated facing pole shoes.

In the embodiment shown in FIG. 3 the apparatus is equipped with two magnets 2 arranged in parallel in the liquid flow. Each of the two magnets is provided with a pole shoe 4 similar to that which is described with reference to FIG. 2, while a second pole piece 5 is formed with segment-shaped cross section so as to fill the space between the magnet and the housing. In this apparatus the gap 7 will arise between the two projections 6 and extend acutely as described with reference to FIG. 2.

FIG. 4 illustrates an apparatus which is similar to that which is shown in FIG. 3, and shows how the gap 7 extends between two corners of the two pole surfaces N and S which face each other.

FIG. 5 illustrates an apparatus which is similar to that shown in FIG. 4, the projections 6 being, however, so formed that the gap 7 will extend in V shape along the pole surfaces N and S which face each other. Consequently, each of the pole shoes 4 is provided with two projections 6 which from their respective corners of a pole surface meet in the middle of the width of the pole shoe at the other end of the surface.

Figure 6:
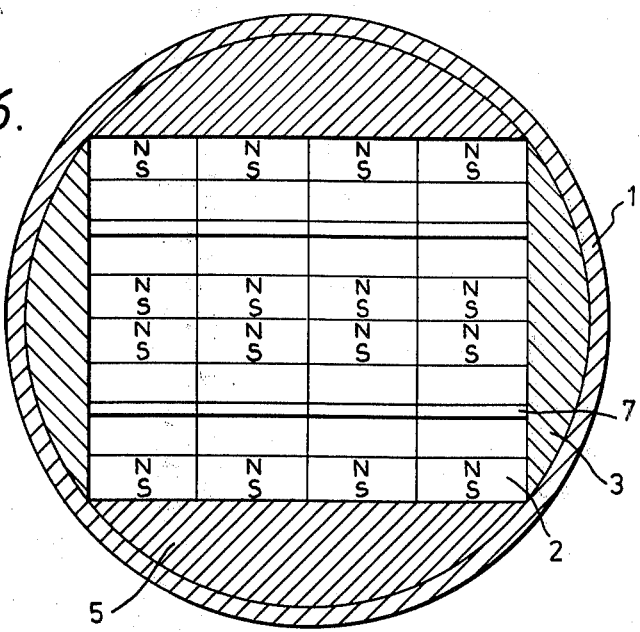
FIG. 6 is a sectional view of another embodiment of the inventive apparatus, the apparatus including eight sets of magnets arranged in parallel.

FIG. 6 is a sectional view of an apparatus which represents an eight doubling of an apparatus of the type shown in FIGS. 3, 4 and 5, comprising eight sets of co-operating magnets with corresponding eight gaps 7 for instance as shown in FIGS. 4 or 5.

Figure 7:
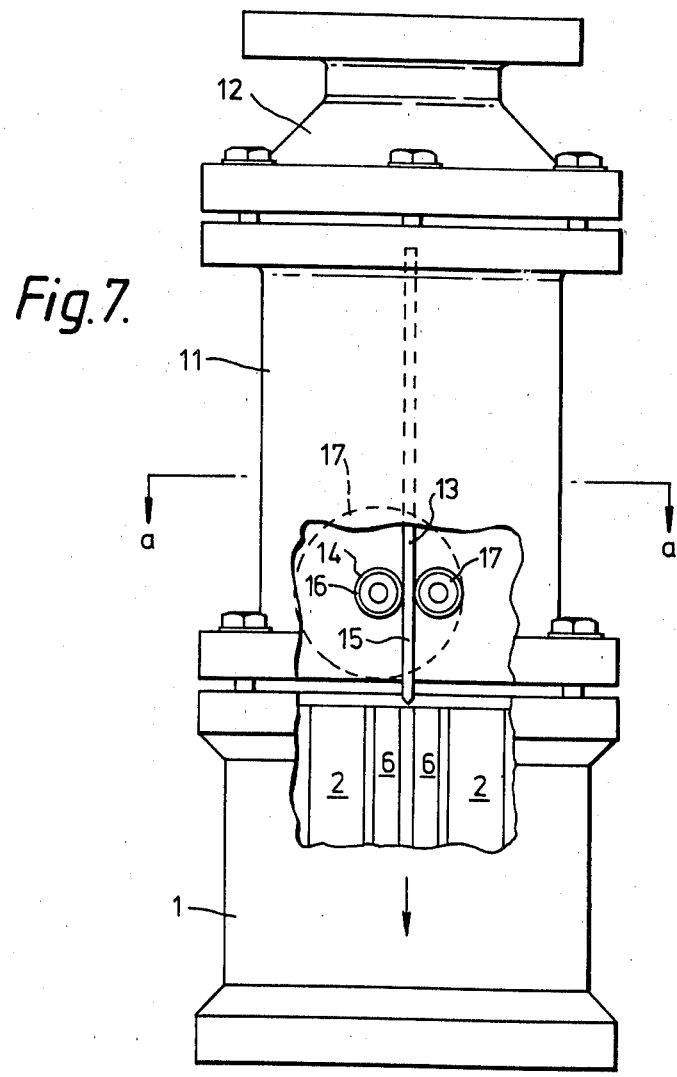
FIG. 7 is an external side view of the inventive apparatus with a part of the housing wall broken away, illustrating the arrangement of a short circuiting member.
Figure 8:
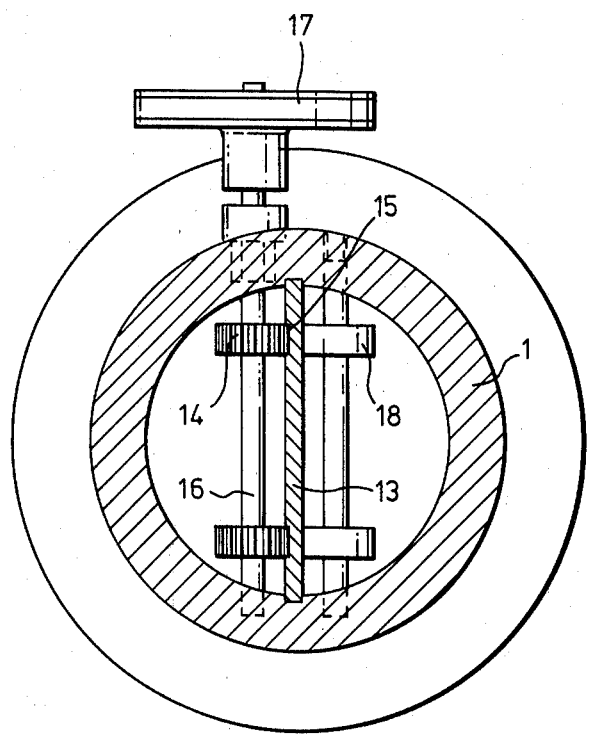
FIG. 8 is a sectional view of the inventive apparatus shown in FIG. 7, taken along the line a—a.

FIGS. 7 and 8 are, respectively, an outside view and a sectional view of a complete apparatus, including means for the adjustment of the flow section of the gap or gaps 7 illustrated in the preceding FIGS. 3 to 6.

As shown, the apparatus comprises a housing 1 provided with a control unit 11 and a connecting piece 12, the latter making the apparatus insertable in a liquid piping. The flow direction is indicated by an arrow. In FIG. 7 the active part of the adjustment means together with the adjoining portion of the magnet system are shown in a broken away part of the walls of the unit 11 and the housing 1, respectively.

As more clearly shown in FIG. 9, the adjustment means comprises a sheet 13 made of non-ferromagnetic material of a thickness corresponding to the width of the magnetic gap 7. The sheet 13 is adapted to be moved in the gap 7 in and against the direction of the liquid flow through the gap. Such movement is effected by means of gears 14 engaging racks 15 in a side face of the sheet 13 and mounted on a shaft 16 which may be rotated in either direction by a hand wheel 17 mounted in the wall of the unit 11. Idle rollers 18 are mounted on the opposite side of the sheet 13 for the purpose of supporting the same against the pressure of the gears 14. Through adjustment of the position of the sheet 13 in the direction of length of the permanent magent 2, the flow section of the gap 7 may be adjusted to the liquid flow desired at any time.

All the apparatus shown in the drawings are intended to be inserted in a pipeline carrying the liquid to be treated, such liquid being passed through the apparatus in the direction indicated by an arrow, i.e., at right angles to the sectional views shown in the drawings. When the liquid is passing through the gap 7, it is subjected to a magnetic field, the flux lines of which extend at right angles to the flow direction of the liquid. Hereby, the components of the liquid which are apt to cause deposits or corrosion in pipes or apparatus upstream of the treatment apparatus will be affected.

I claim:

1. An apparatus for the magnetic treatment of a flowing liquid which comprises
   an elongated housing which is made at least in part of a ferromagnetic material, said housing providing a liquid flow channel therethrough having an inlet end and an outlet end,
   at least one elongated permanent magnet positioned in said housing, each permanent magnet having pole surfaces on opposing sides thereof,
   at least one elongated pole shoe associated with each premanent magnet, each pole shoe being positioned adjacent a pole surface of the associated permanent magnet and each pole shoe including a least one elongated projection portion which extends away from the adjacent pole surface of the associated permanent magnet and into the flow channel so as to form an associated elongated gap through which the liquid passing along the liquid flow channel must flow, each projection portion and thus each gap extending at an acute angle with respect to the flow direction of the liquid passing along the liquid flow channel in said housing.

2. An apparatus as defined in claim 1 wherein said elongated housing comprises an annular cylinder.

3. An apparatus as defined in claim 2 wherein each said projection portion extends rectilinearly with respect to the adjacent pole surface of the associated permanent magnet.

4. An apparatus as defined in claim 2 wherein each projection portion extends in a V-shape with respect to the adjacent pole surface of the associated permanent magnet, the base of the V-shape being nearest the inlet end of said housing.

5. An apparatus as defined in claim 2, wherein only one elongated permanent magnet is positioned in the middle of the liquid flow channel in said annular cylinder and wherein a separate elongated pole shoe is associated with each pole surface of said permanent magnet thereby forming two gaps through which the flowing liquid must pass, each gap being formed between the inside of the annular cylinder and the top of the projection portion of the adjacent pole shoe.

6. An apparatus as defined in claim 2 wherein a pair of elongated permanent magnets are positioned in said annular cylinder and wherein a separate elongated pole shoe is associated with the facing sides of the two permanent magnets such that the gap through which the flowing liquid must pass is formed between the adjacent top ends of the projection portions of the two pole shoes.

7. An apparatus as defined in claim 6 wherein a plurality of said elongated permanent magnet pairs are positioned in said annular cylinder to form a plurality of parallel gaps through which the flowing liquid can pass.

8. An apparatus as defined in claim 1 including means movably positionable in each of said gaps to change the dimensions thereof.

* * * * *

UNITED STATES PATENT AND TRADEMARK OFFICE
CERTIFICATE OF CORRECTION

PATENT NO. : 4,390,423
DATED : June 28, 1983
INVENTOR(S) : Eilert Sundt

It is certified that error appears in the above-identified patent and that said Letters Patent are hereby corrected as shown below:

On the title page add:

-- [30] Foreign Application Priority Data

Oct. 29, 1979 [NO] Norway.............79.3481 --.

Signed and Sealed this

Eighteenth Day of October 1983

[SEAL]

Attest:

Attesting Officer

GERALD J. MOSSINGHOFF

Commissioner of Patents and Trademarks